United States Patent [19]

Lane

[11] 4,449,318
[45] May 22, 1984

[54] FISHING BOBBER

[76] Inventor: Garnett S. Lane, 301 Green Rd., Madison, Ind. 47250

[21] Appl. No.: 295,639

[22] Filed: Aug. 24, 1981

Related U.S. Application Data

[63] Continuation-in-part of Ser. No. 157,336, Jun. 9, 1980, abandoned.

[51] Int. Cl.³ .......................................... A01K 93/00
[52] U.S. Cl. .................................................. 43/44.9
[58] Field of Search .................... 43/44.87, 44.9, 44.91

[56] References Cited

U.S. PATENT DOCUMENTS

| | | | |
|---|---|---|---|
| 2,576,237 | 11/1951 | Parry | 43/43.15 |
| 2,693,049 | 11/1954 | Atton | 43/44.9 |
| 2,803,083 | 8/1957 | Moore | 43/57.1 |
| 2,827,731 | 3/1958 | Haynes | 43/43.14 |
| 3,803,749 | 4/1974 | Boyum | 43/44.9 |
| 3,990,172 | 11/1976 | Hagquist | 43/43.14 |

Primary Examiner—Nicholas P. Godici

[57] ABSTRACT

A fishing bobber includes a preformed generally egg-shaped hollow shell having a generally semispherical-shaped top and a generally conical-shaped bottom. The top and bottom of the egg-shaped shell include diametrically opposed apertures, and an elongated flexible tubular member extends longitudinally through the apertures and the shell. The tubular member has a first end which includes a peripheral flange extending radially therefrom for engaging the top of the shell and a second end projecting beyond the bottom of the shell. The diameters of the apertures are slightly smaller than the outside diameters of the tubular member to form compression joints between the tubular member and the apertures to provide a sealed hollow compartment within the shell. A line is slidable through the hollow tubular member. The second end of the tubular member includes a line guide and provides a fulcrum for self-righting the shell with minimum weight attached to the line.

1 Claim, 5 Drawing Figures

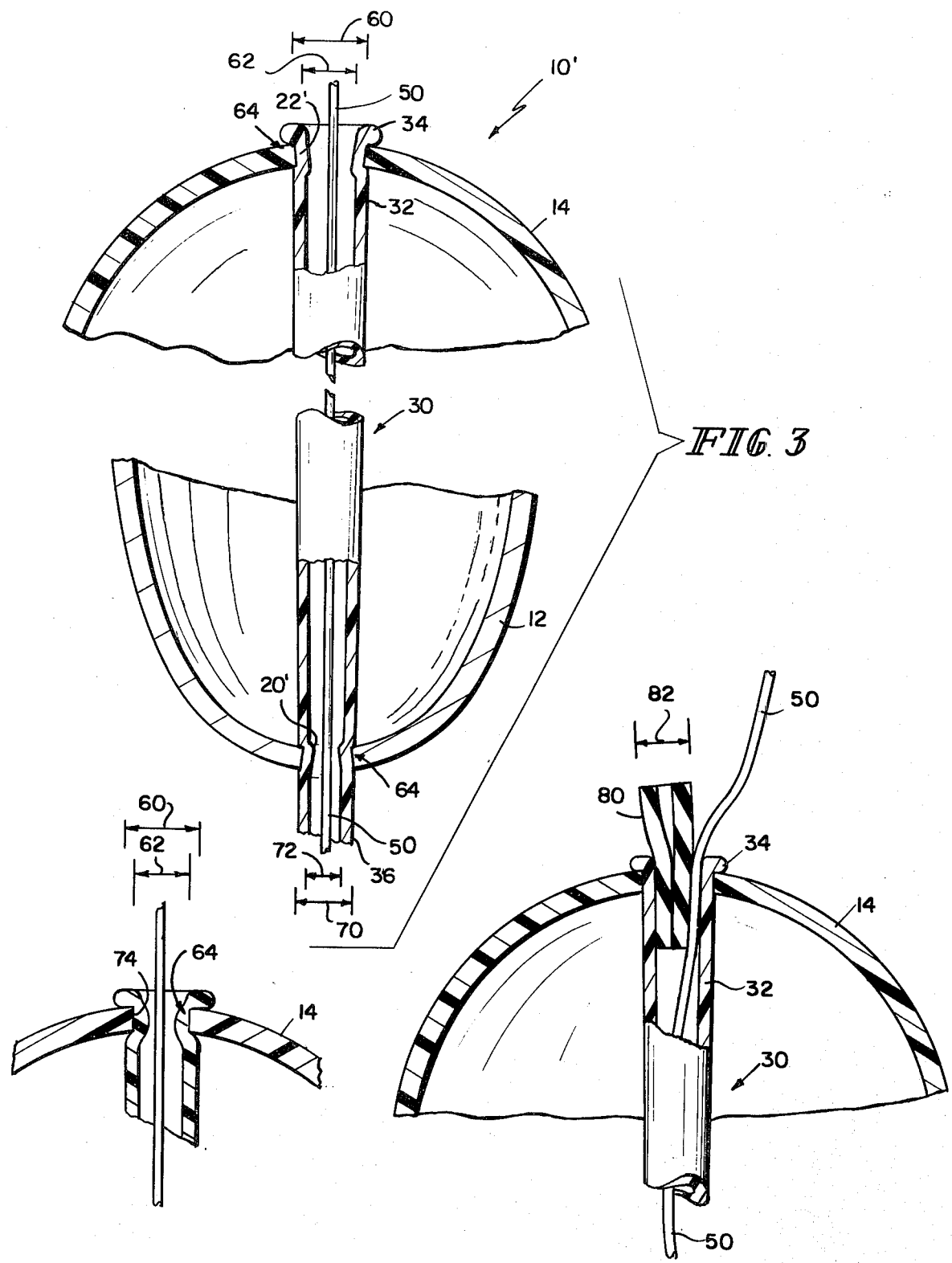

FISHING BOBBER

This is a continuation-in-part of my application Ser. No. 157,336, filed June 9, 1980, now abandoned.

The present invention relates generally to fishing apparatus, and in particular to fishing bobbers which are intended to float on the surface of a body of water and suspend the bait at a predetermined depth beneath the water surface. More particularly, the present invention relates to improvements in a fishing bobber.

Fishing bobbers are well known to fishermen and others familiar with the sport of fishing. Typically, the fishing bobber includes a hollow member which is secured to a fishing line or string and allowed to float on the surface of a body of water. By securing the bobber to the line at various locations, the bait is suspended at various predetermined depths beneath the water surface while the bobber is afloat. When a fish pulls on the fishing line, the bobber is drawn beneath the water surface to provide a visual indication to the fisherman that a fish is present. Because of the design and structure of these conventional bobbers, they have heretofore been relatively expensive to construct.

It is therefore one object of the present invention to provide a fishing bobber which is constructed of preformed parts which are readily available on the market. These parts include a preformed plastic egg constructed of a high-density impact resistant polystyrene material and the preformed stem from a dropper constructed of a low-density polyethylene material. Accordingly, the manufacture of a fishing bobber of the present invention is relatively inexpensive.

Another object of the present invention is to provide a fishing bobber which is lightweight and completely sealed to provide a leak proof hollow compartment inside the shell of the bobber.

A further object of the present invention is to provide a fishing bobber which rights itself on the water surface with minimum weight on the line and which substantially eliminates abrasions and frictional drag against the line.

According to the present invention, a fishing bobber includes a preformed generally egg-shaped hollow shell having a generally semispherical-shaped top and a generally conical-shaped bottom, diametrically opposed apertures formed in the top and bottom of the shell, an elongated flexible tubular member engaging the apertures and extending longitudinally through the shell, the tubular member having a first end including a peripheral flange extending radially therefrom for engaging the top of the shell, and a second end projecting beyond the bottom of the shell, means for sealing the shell around the tubular member in proximity to the apertures in the shell, a line slidable through the hollow tubular member to allow movement of the shell along the string, a spherical member for seating in the first end of the tubular member, the spherical member including a slideway for receiving the string, and means provided on the string for limiting movement of the spherical member and the shell in at least one direction along the string. The egg-shaped hollow shell includes upper and lower sections which are chemically welded together to seal the shell. The means for sealing the shell around the tubular member includes compression joints formed by apertures having diameters slightly less than the outside diameter of the tubular member so that the tubular member is compressed in proximity to the apertures.

Various other features and advantages of the present invention will become apparent in view of the following detailed description of one embodiment thereof, which description should be viewed in conjunction with the accompanying drawings, in which:

FIG. 3 is an enlarged transverse view, partly cross-sectioned and partly broken away, of a fishing bobber embodying the present invention;

FIG. 4 is an enlarged cross-sectional view of a fragment of a fishing bobber embodying the present invention; and FIG. 5 is an enlarged transverse view of a section, partly cross-sectioned and partly broken away, of a fishing bobber embodying the present invention.

Figure 1:
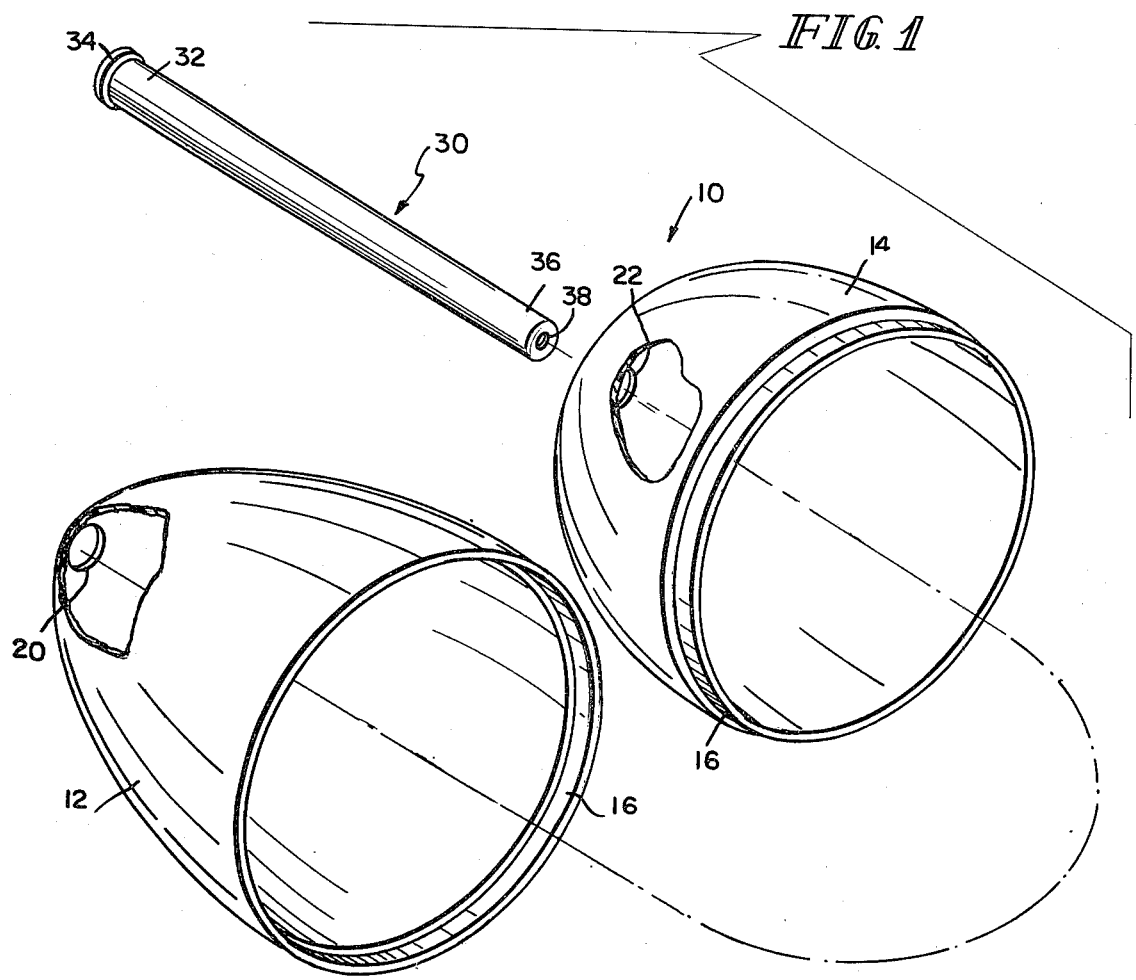
FIG. 1 is an exploded perspective view of a fishing bobber according to the present invention showing the interrelationship of its various parts.
Figure 2:
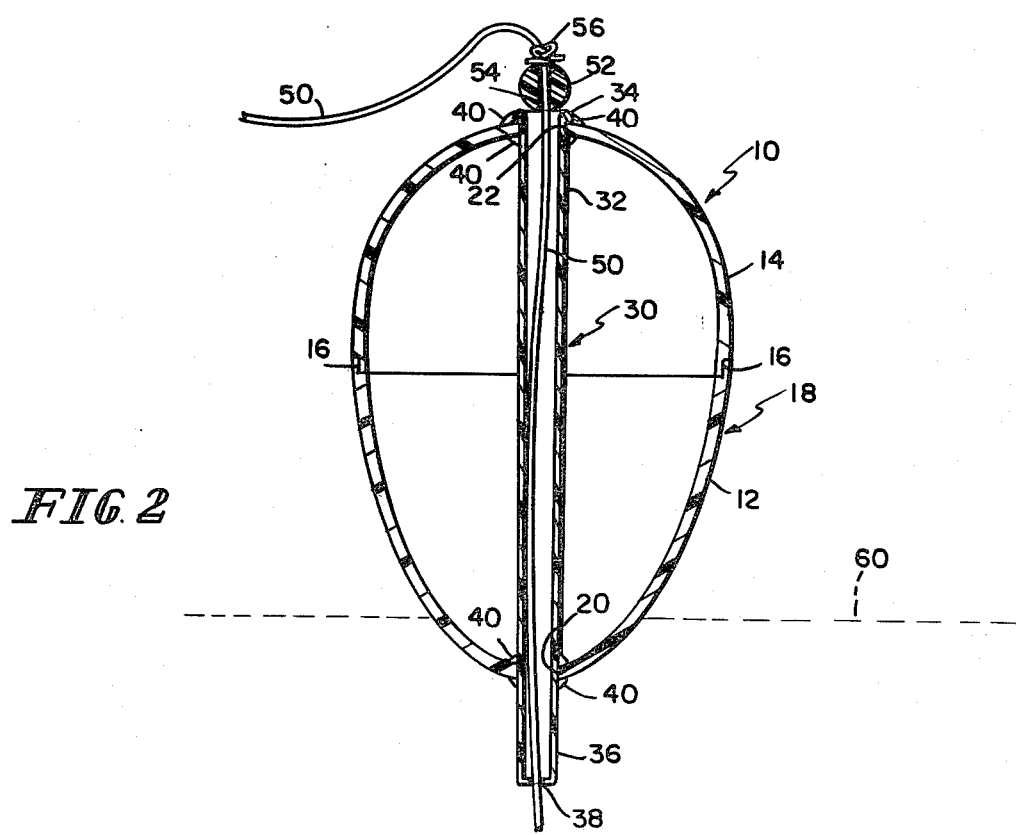
FIG. 2 is a cross-sectional view of the bobber of FIG. 1, shown floating on the surface of a body of water.

Referring to FIGS. 1 and 2, an inexpensive fishing bobber 10, according to the present invention, is generally egg-shaped, as can best be seen in FIG. 2, and includes a thin preformed shell constructed of a high-density impact resistant polystyrene material. The bobber 10 includes a lower or bottom section 12 which is generally conical-shaped and an upper or top section 14 which is generally semispherical-shaped. Each of the sections 12, 14 includes a cooperating portion 16 for tightly joining the two sections 12, 14 to form a hollow generally egg-shaped shell 18. The portions 16 of the sections 12, 14 may provide a snap friction, a threaded, or other conventional type connection in order to form the shell 18. Preferably, the portions 16 are chemically welded using a chemical solvent such as, for example, methylene chloride, to provide a tight and complete seal between the two shell sections 12, 14.

One feature of the present invention is that the egg-shaped shell 18 can be one of the many commercially available high-density polystyrene plastic eggs of the type having multiple-colored lower and upper sections 12, 14 which can be purchased in most department stores, particularly during the Easter season. These commercially available eggs are available in at least six different highly visible solid colors and in at least four different sizes. The two sections 12, 14 of the shell can both be the same color or a combination of two different colors for both day and night fishing. Selection of the desired color arrangement for the bobber can be made at the time of the assembly of the two sections 12, 14. The four different sizes of eggs make it possible to provide four different sizes of bobbers enabling the fisherman to choose the size in relation to the species of fish sought, from blue-gills to muskellunge. Furthermore, the polystyrene construction of the eggs makes the bobbers very lightweight so that they can easily be used with either light spinning tackle or heavier bait-casting tackle. For example, a large bobber weighs approximately 0.575 ounce (16.3 grams) and a small bobber weighs approximately 0.088 ounce (2.5 grams). Two intermediate size bobers weight between the range of the weights of the large and small bobbers. The combined weight of the four different size bobbers is 30.8 grams which is slightly more than 1 ounce (28.35 grams).

Formed in the conical-shaped bottom 12 is a first aperture 20, and formed in the semispherical top 14 is a second diametrically opposed aperture 22. Extending through the diametrically opposed apertures 20, 22 and through the hollow inner compartment of the shell 18 is an elongated hollow tubular member 30. The tubular member 30 is cylindrical, tapered, and constructed of a tough low-density polyethylene material which is slightly resilient.

Another feature of the present invention is that the tubular member 30 can be the stem from a commercially available medicine dropper which can be purchased in most department or drug stores. Because of the size of the smaller bobber, a section of resilient nylon tube is used for the tubular member 30. The material composition and resiliency of both the medicine dropper and nylon tube substantially eliminate any abrasing which might cut or interfere with a line passing therethrough. It can therefore be appreciated that the fishing bobber 10 of the present invention can be inexpensively constructed from commercially available parts.

The tubular member 30 includes a first end 32 having a peripheral flange 34 extending radially therefrom for engaging the semispherical top 14 of the shell 18 and providing a ledge for positioning and supporting the tubular member 30 in the shell 18. The tubular member extends longitudinally through the shell 18, and includes a second end 36 which projects through the aperture 20 in the conical-shaped bottom 12 longitudinally beyond the periphery of the shell 18. As previously indicated, the tubular member 30 is tapered so that the first end 32 has a cross-sectional diameter which is greater than the cross-sectional diameter of the second end 36. Further, the second end 32 is partially closed to provide a small opening 38. As will be explained later, opening 38 provides a line guide for the fishing line and in combination with the extension of end 36, and the shape of section 12 also provides a fulcrum for righting the bobber on the water surface.

The hollow compartment of the shell 18 is sealed around the tubular member 30 in proximity to the apertures 20, 22 by a sealing glue 40 which is insoluble in water and solidifies rapidly . An example is 'super glue' manufactured by Loctite Corporation. Apertures 20 and 22 are tapered in the manner shown in FIG. 3. The tapered apertures 20 and 22 can be formed by using a tapered Nicholson rotary power file manufactured by Cooper Industries. The tapered apertures 20, 22 provide a crevice (not shown) adjacent to the tubular member 30 for holding the sealing glue 40.

A strand of fishing line or string 50 is slidable through the tubular member 30 with minimal friction to allow the shell 18 of the bobber 10 to slide along the line 50. The conventional medicine dropper used for the tubular member 30 in the large and intermediate size bobbers can accommodate fishing lines from 4 lb. test to 50 lb. test which can be either monofilament or braided and either waterproof treated or not treated. A spherical member 52, such as a bead, is slidably carried by the line 50, and includes a central bore or slideway 54 for receiving the line 50. The spherical member 52 has a cross-sectional diameter which is slightly greater than the cross-sectional diameter of the first end 32 of the tubular member 30 so that the spherical member 52 seats in the first end 32 of the tubular member 30. Formed on the line 50 is a knot 56 of a size greater than the slideway or bore 54 in the spherical member 52 to prevent the spherical member 52 from sliding past the knot 56 along the line 50. Knot 56 may be formed by tying a section of rubber band to the line 50. It will be understood that other means may be provided either on or in the line 50 to prevent movement of the spherical member 52 along the line 50 without departing from the scope of the present invention. In fact, means for limiting the movement of the spherical member 52 in at least one direction along the line 50 may be removable so that it can be located at various points along the line 50. When the spherical member 52 engages the knot 56 and the shell 18 slides along the line 50, the spherical member 52 will become seated in the first end 32 of the tubular member 30 to limit and prevent movement of the shell 18 along the line 50.

In operation, when the bobber 10 is cast onto a water surface 60, as best illustrated in FIG. 2, the shell 18 floats on the surface 60 with the bottom section 12 resting on the surface 60 and the top section 14 being supported above the water surface 60. Initially, when the shell 18 is cast onto the water surface 60, the line 50 is drawn through the tubular member 30 by a weight (not shown) attached to the line 50. At the desired depth, determined by the location of the knot 56 on the line 50, the spherical member 52 seats in the first end 32 of the tubular member 30 and engages the knot 56 to prevent further movement of the line 50 through the tubular member 30.

Because the bobber 10 is lightweight, it is only necessary for a minimum amount of weight (not shown) to be attached to the line 50. The weight attached to the line 20 need only be sufficient to actuate the reel attached to the other end of the line 50 or to control live bait if it is used. Minimum weight on the line 50 is important to allow free play of the line 50.

One of the problems with the heavier conventional bobbers is that in casting, the bobber leads the line and bait. This results in the bobber striking the water before the bait. The trailing bait end of the line 50 many times is left draped over the line 50 between the bobber and the reel. The design and lightweight features of the bobber 10 embodying the present invention allow the bait to strike the water surface first during casting and to continue to the predetermined depth with no lag.

The longitudinally projecting second end 36 of the tubular member 30, the small opening 38 provided in the second end 36, and the shape of the bottom section 12 of the shell in conjunction with the weight (not shown) attached to the line 50 beneath the water surface 60 cause the egg-shaped shell 18 to float upright in the position illustrated in FIG. 2. These are self-righting features of the bobber 10. Without the longitudinally projecting second end 36 and the small opening 38 provided therein, the shell 18 would have a tendency to fall to one side or the other. The projecting second end 36 and the line guide 38 serve as a fulcrum for righting the bobber 10 on the water surface 60. Minimum weight on the line 50 is needed to self-right the bobber 10. Furthermore, it can be appreciated that in order for the shell 18 to float upright, the weight (not shown) attached to the line 50 beneath the water surface 60 must hang freely and not rest on a surface beneath the water surface 60. As the line 50 and bobber 10 are removed from the water surface 60, the shell 18 and spherical member 52 will slide down the line 50 until the second end 32 engages the weight (not shown) attached to the line 50. Accordingly, when the line 50 and bobber 10 are again cast onto the water surface 60, only a small amount of the line 50 needs to be swung on the end of a pole (not shown) in order to cast the line 50 and bobber 10.

The use of a polystyrene shell and a polyethylene or nylon tubular member 30 in the construction of the bobber allows the fisherman to use the bobber in either fresh or salt water without interchanging parts and with equally good results.

Referring to FIG. 3, a bobber 10' embodying the present invention is constructed in generally the same way as bobber 10 previously described except that sealing glue 40 is not needed. End 32 of tubular member 30 adjacent to the flange 34 has an outside diameter 60 of approximately 0.297 inch (0.760 cm), and end 36 of tubular member 30 in proximity to the bottom section 12 of shell 18 has an outside diameter 70 of approximately 0.250 inch (0.635 cm). Aperture 22' in the top section 14 of shell 18 has a diameter 62 which is about 0.020 to 0.025 inch (0.051 to 0.064 cm) smaller than the outside diameter 60 of end 32, and aperture 20' in the bottom section 12 of shell 18 has a diameter 72 which is about 0.020 to 0.025 (0.051 to 0.064 cm) smaller than the outside diameter 70 of end 36. As previously discussed, apertures 20' and 22' are shown in FIG. 3 as being tapered. When tubular member 30 is inserted through apertures 20' and 22', it is compressed to form compression seals or joints 64 between the tubular member 30 and the apertures 20' and 22'. The thickness of the side wall of tubular member 30 is about 0.030 to 0.035 inch (0.076 to 0.089 cm). The polyethylene material and thickness of the side wall allow the side wall to be compressed as the tubular member is inserted through the apertures 20' and 22'. The compression joints 64 form tight seals to prevent liquid from getting inside the shell 18.

Referring to FIG. 4, apertures in both the top section 14 and bottom section 12 may be formed without the taper. Aperture 74 in the top section 14 has the same cross-sectional dimension 62 as the aperture 22' shown in FIG. 3 so as to provide a compression joint or seal 64. Further, an aperture in the bottom section 12 similar to aperture 74 would have the same cross-sectional dimension 72 as the aperture 20' shown in FIG. 3 so as to provide a compression joint or seal 64 between the tubular member 30 and the bottom section 12.

Referring to FIG. 5, a section of polyvinyl tubing 80 is provided for insertion into the end 32 of tubular member 30 to lock the shell 18 in a fixed position along line 50. Tubing 80 is preferably about 2.50 inches (6.35 cm) long and has an outside diameter 82 of approximately 0.188 inch (0.350 cm). End 32 of tubular member 30 has an inside diameter which is slightly greater than the outside diameter 82 of tubing 80. By compressing tubing 80 and inserting it into end 32 of tubular member 30, line 50 is captured between the tubing 80 and side wall of member 30 to lock the shell 18 in a position on the line 50. Tubing 80 may be easily removed, the shell moved to a different position on the line 50, and the tubing 80 reinserted into end 32 to lock the shell 18 at the different position.

What is claimed is:

1. A fishing bobber, comprising a preformed plastic egg-shaped shell having a generally hollow semispherical-shaped top section and a generally hollow conical-shaped bottom section, a chemical weld connection providing a seal between the top and bottom sections, diametrically opposed apertures formed in the top and bottom sections of the shell, each having a predetermined cross-sectional dimension, the dimension of the aperture in the top section being larger than the dimension of the aperture in the bottom section, an elongated tapered resilient tube exhibiting substantially non-memory properties and engaging said apertures and extending longitudinally through the shell, the tube including a first end having a first cross-sectional dimension which is about 0.020 to 0.025 inch greater than the cross-sectional dimension of the aperture in the top section to form a compression seal between the top section and the tube, the tube further including a second end having a second cross-sectional dimension which is about 0.020 to 0.025 inch greater than the cross-sectional dimension of the aperture in the bottom section to form a compression seal between the bottom section and the tube, the first and having a greater cross-sectional dimension than the second end, so that when the tube is inserted into the shell, there is no deformation of the top shell aperture or the tube bottom until the final seating of the top of the tube with the top shell aperture and the bottom of the tube with the bottom shell aperture, the first end including a peripheral flange extending radially therefrom for engaging the top section of the shell, the second end of the tube including a line guide opening having a cross-sectional dimension which is slightly greater than the cross-sectional dimension of the line, the second end projecting beyond the periphery of the bottom section of the shell to provide a fulcrum for stabilizing the shell in an upright position on a liquid surface with minimum weight on the line beneath the surface.

* * * * *